United States Patent
Craggs et al.

(10) Patent No.: US 10,216,610 B2
(45) Date of Patent: Feb. 26, 2019

(54) DEBUG SESSION ANALYSIS FOR RELATED WORK ITEM DISCOVERY

(71) Applicant: INTERNATIONAL BUSINESS MACHINES CORPORATION, Armonk, NY (US)

(72) Inventors: Daniel P. Craggs, Montreal (CA); Jeremiah S. Swan, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/276,841

(22) Filed: Sep. 27, 2016

(65) Prior Publication Data
US 2018/0089060 A1 Mar. 29, 2018

(51) Int. Cl.
G06F 11/00 (2006.01)
G06F 11/36 (2006.01)

(52) U.S. Cl.
CPC ...... *G06F 11/3624* (2013.01); *G06F 11/3664* (2013.01)

(58) Field of Classification Search
USPC ........................................... 714/38.1
See application file for complete search history.

(56) References Cited

U.S. PATENT DOCUMENTS

| | | | |
|---|---|---|---|
| 7,096,458 B2 | 8/2006 | Bates et al. | |
| 7,343,588 B2 | 3/2008 | Bates et al. | |
| 8,347,269 B2 | 1/2013 | Lazzaro et al. | |
| 8,504,994 B2 | 8/2013 | Golender et al. | |
| 8,909,990 B2 | 12/2014 | Davis et al. | |
| 8,910,120 B2 | 12/2014 | Srinivasa et al. | |
| 8,935,673 B1 | 1/2015 | Ashkenazi et al. | |
| 9,032,374 B2 | 5/2015 | Munson et al. | |
| 2009/0327809 A1 | 12/2009 | Joy et al. | |
| 2012/0144256 A1 | 6/2012 | Bailey | |
| 2016/0203072 A1* | 7/2016 | Boxall | G06F 8/70 717/128 |
| 2016/0282408 A1 | 9/2016 | Langevin | |

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Sarai E Butler
(74) *Attorney, Agent, or Firm* — Arnold B. Bangali

(57) ABSTRACT

A method for automatic debug session analysis for related work item discovery, is provided. The method includes recording metadata describing a particular debug session associated with a user for a respective work item. The method further includes associating the metadata recorded in the particular debug session with the respective work item. In response to the user working on a new issue, comparing the metadata saved with other work items. In response to identifying a work item with a predetermined level of similar metadata from debug sessions, notifying the user of a potential work item match. In response to not identifying a work item with a predetermined level of similar metadata from debug sessions, refraining from suggesting the new issue for future matches.

18 Claims, 6 Drawing Sheets

(56) References Cited

OTHER PUBLICATIONS

Ashok et al. "DebugAdvisor: A Recommender System for Debugging", ESEC-FSE'09, Aug. 23-28, 2009, 10 pages.
Craggs et al., "Debug Session Analysis for Related Work Item Discovery", pending U.S. Appl. No. 15/900,863, filed Feb. 21, 2018, pp. 1-29.
IBM, "List of IBM Patents or Patent Applications Treated As Related (Appendix P)", dated Mar. 23, 2018, pp. 1-2.

\* cited by examiner

US 10,216,610 B2

DEBUG SESSION ANALYSIS FOR RELATED WORK ITEM DISCOVERY

BACKGROUND

The present invention relates generally to the field of computers, and more particularly to automatic debug session analysis of systems.

Often problems and defects have been discovered by previous developers in code repositories. Either the problem wasn't fixed properly, or they decided not to fix it. It might even be user error. Work management software integrated into source code repositories such as rational team concert (RTC) give a wealth of information on these previous defects or code changes but it's not always possible to immediately find which work item is relevant to the problem a developer is currently debugging. A developer can waste a lot of time diagnosing a problem that has already been diagnosed and in some cases solved. At other times, a developer may spend a long time debugging a problem in a certain part of the code, but the problematic code change may exist elsewhere and may indirectly cause the problem.

SUMMARY

According to one embodiment, a method for automatic debug session analysis for related work item discovery is provided. The method includes recording metadata describing a particular debug session associated with a user for a respective work item. The method further includes associating the metadata recorded in the particular debug session with the respective work item. The method further includes in response to the user working on a new issue, comparing the metadata saved with other work items. The method further includes in response to identifying a work item with a predetermined level of similar metadata from debug sessions, notifying the user of a potential work item match. The method further includes in response to not identifying a work item with a predetermined level of similar metadata from debug sessions, refraining from suggesting the new issue for future matches.

According to another embodiment, a computer system for automatic debug session analysis for related work item discovery, is provided. The computer system includes one or more processors, one or more computer-readable memories, one or more computer-readable tangible storage devices and program instructions which are stored on at least one of the one or more storage devices for execution by at least one of the one or more processors via at least one of the one or more memories. The computer system further includes program instructions to record metadata describing a particular debug session associated with a user for a respective work item. The computer system further includes program instructions to associate the metadata recorded in the particular debug session with the respective work item. The computer system further includes program instructions to comparing the metadata saved with other work items in response to the user working on a new issue. The computer system further includes program instructions to notify the user of a potential work item match in response to identifying a work item with a predetermined level of similar metadata from debug sessions. The computer system further includes program instructions to refrain from suggesting the new issue for future matches in response to not identifying a work item with a predetermined level of similar metadata from debug sessions.

According to another embodiment, a computer program product for automatic debug session analysis for related work item discovery is provided, the computer program product comprising one or more computer-readable tangible storage devices and program instructions stored on at least one of the one or more computer-readable tangible storage devices. The program instructions comprise program instructions to record metadata describing a particular debug session associated with a user for a respective work item. The program instructions further comprise program instructions to associate the metadata recorded in the particular debug session with the respective work item. The program instructions further comprise program instructions to comparing the metadata saved with other work items in response to the user working on a new issue. The program instructions further comprise program instructions to notify the user of a potential work item match in response to identifying a work item with a predetermined level of similar metadata from debug sessions. The program instructions further comprise program instructions to refrain from suggesting the new issue for future matches in response to not identifying a work item with a predetermined level of similar metadata from debug sessions.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
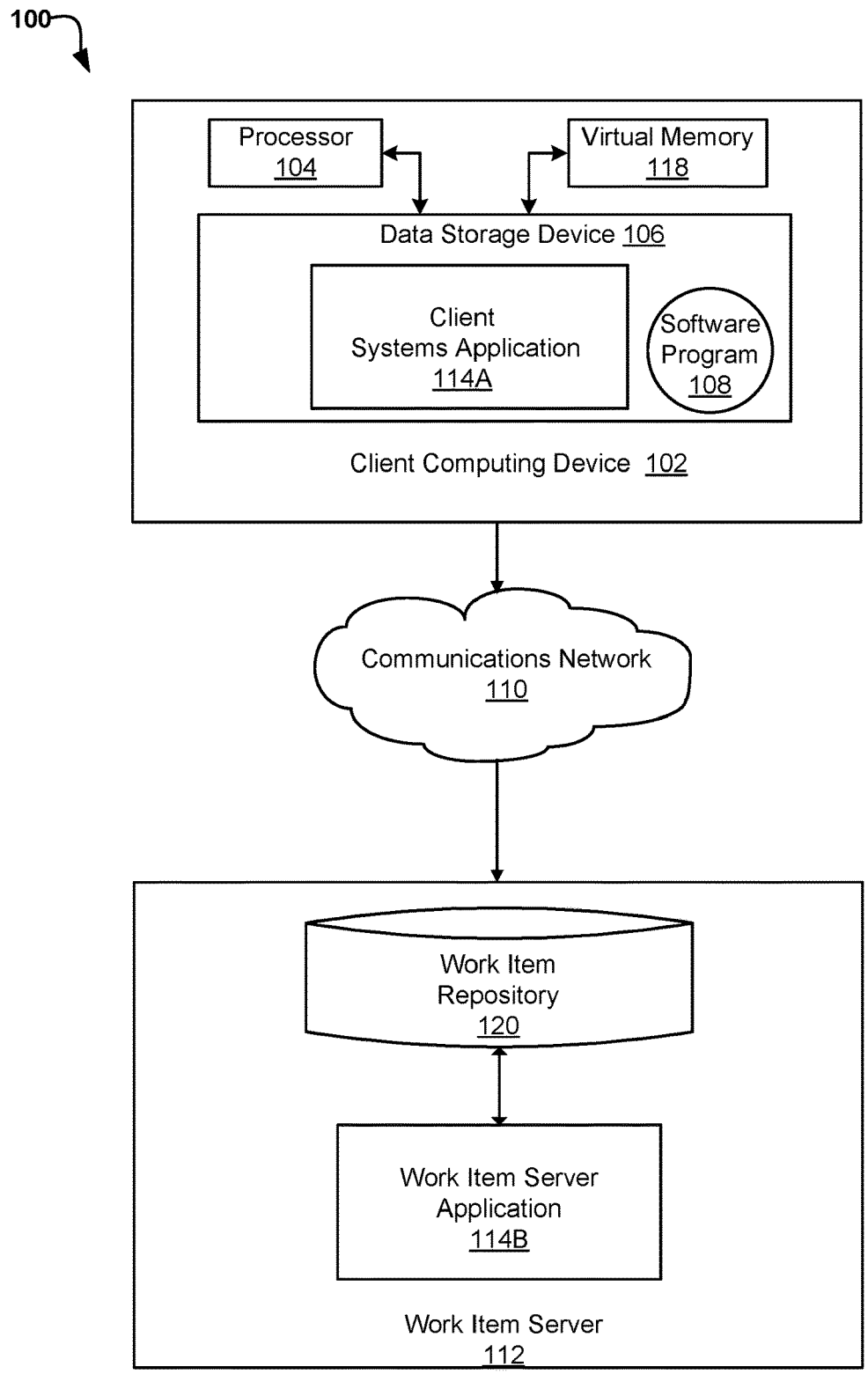
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention relates generally to the field of computers, and more particularly to automatic debug session analysis of systems. The following described exemplary embodiments provide a system, method and program product to, among other things, automatic debug session analysis of systems. Therefore, the present embodiment has the capacity to improve the computer systems compliance field.

During system monitoring and compliance, whilst developers develop and debug their code, recording relevant metadata and associating it with their current work item, a computer system may monitor actions by the developers to enhance efficient systems integration. As previously described, however, developers can waste a lot of time diagnosing a problem that has already been diagnosed and in some cases solved. At other times, a developer may spend a long time debugging a problem in a certain part of the code, but the problematic code change may exist elsewhere and may indirectly cause the problem. Further, one can use a text search on a code repository to match descriptions of work items. However, the search requires the correct terminology to be matched by the one who created the work item and one who is searching for it, and it can be easy to not be able to find the correct work item. One can also inspect code change histories to see which work items have affected the code you are currently inspecting. Looking at a code's change history can be limited help if the defective behavior is fixed elsewhere in a super class for example. As such, it may be advantageous to store metadata on a developers debug session whilst the debugger is working on work items.

The present invention provides a system platform for monitoring and storing metadata on developers debug sessions whilst working on work items. This includes breakpoints set, stack traces collected, exceptions, variable reference searches, call type hierarchy inquiries as well as variables and monitors set and their values. By recording this information and associating it with the relevant work item, this invention builds a foundation for future debug sessions to compare themselves to. For instance, when a user is then working on a new issue, the metadata collected can be compared against other work items. If there's a work item with sufficiently similar metadata from the developer debug sessions, the user can be prompted or they can ask explicitly that there is a possible matching work item. The user can then check the work item to see if it covers the same problem or if it somehow related. By determining it's not a match, the invention can stop suggesting it for future matches if the user wishes.

Embodiments of the present invention have advantages as it can suggest matching work items based on a developer's behavior rather than just their code change. It means that work items that require debugging the code but not necessarily changing it can be suggested as related work item, which is something existing code repositories do not have the ability to do today. For example, aspects of the invention monitor developers whilst they develop and debug their code, recording relevant metadata and associating it with their current work item. As previously described, alternative embodiments could also extract metadata from historical work items comments with stack traces, delivered change sets, saved breakpoint files and log files to provide a limited analysis on work items completed before the implementation of this invention. In one implementation, the user can specify which work item they are currently working on before debugging, or this could be detected automatically. This way debug data can be correctly attributed to the correct work item. In one aspect, one implementation of this invention works on a point based system to determine similarity of work items. For each similarity, for instance, two work items contain in their metadata, a certain number of points are attributed based on the significance of similarity. Different categories are described in more detail below:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide automatic debug session analysis of systems.

Referring to FIG. 1, computer system environment 100, for monitoring developers whilst they develop and debug their code, recording relevant metadata, and associating it with their current work item, whereby the work items may include breakpoints set, stack traces collected, exceptions, variable reference searches, call type hierarchy inquiries, as well as, variables and monitors set and their value.

According embodiments to the present invention, by recording the work items and associate the work items with pre-recorded work items, the invention builds a foundation for debug sessions, whereby developers may properly address system malfunction that was addressed in a previous or re-recorded debug session. The computer system environment 100 may include a client computing device 102 with a processor 104, a data storage device 106, and memory 118, which is enabled to run, or execute program instructions of a software program 108, according to embodiments of the present invention. The client computing device 102 may include a client systems application 114A, for configuring client preferences for specifying which work item they are currently working on before debugging the work item. The computer system environment 100 may also include a work item server 112, running a work item server application 114B, and interconnected with client computing device 102, over communications network 110, for recording relevant metadata, and associating it with their current work item. The work item server 112 may also enable the delivery and operation of secure, personalized applications for monitoring work items of users to client computing device 102. The computer system environment 100 may also include a plurality of client computing device 102 and work item server 112, only one of which is shown, at least in FIG. 1.

The memory 118 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable mobile computing storage medium that may be used to carry or store desired program code and program data in the form of instructions or data structures and that may be accessed by other components of client computing device 102, for ensuring that monitoring of developers whilst they develop and debug their code, recording relevant metadata, and associating it with their current work items are accurately displayed on client computing device 102, according to embodiments of the present invention.

The communications network 110 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements, according to embodiments.

The client computing device 102 may communicate with the work item server application 114B, running on work item server 112, via the communication network 110, for providing a virtualized framework for displaying representations or results of debug work item to a client of client computing device 102. The communications network 110 may also include connections, such as wire, wireless communication links, or fiber optic cables. As will be discussed with reference to FIG. 6, work item server 112 may include internal components 800a and external components 900a, respectively, and client computing device 102 may include internal components 800b and external components 900b, respectively.

The client computing device 102 may be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for providing a virtualized mobile framework for client computing device 102, recording the work items and associate the work items with pre-recorded work items, the invention builds a foundation for debug sessions. The client computing device 102 may also be laptop, tablet, or notebook personal computer (PC), a desktop computer, a mainframe or mini computer, or a personal digital assistant (PDA). The data storage device 106 of the client computing device 102 is any type of storage device, storage server, storage area network, redundant array of independent discs (RAID), cloud storage service, or any type of data storage. The data storage device 106 may also be a relational model database server for storing program instructions selection work item items with pre-recorded work items, in client computing device 102, according to embodiments.

Work item server 112 may be, for example, a server computer system such as a management server, a web server, or any other electronic device or computing system capable of receiving and sending data, including, for displaying representations of charts of swatches of legends, based on client preferences of the client computing device 102.

Further, the work item server 112 may also represent a "cloud" of computers interconnected by one or more networks, whereby work item server 112 may be a primary server for a computing system utilizing clustered computers when accessed through communications network 110. The work item repository 120 is any type of storage device, storage server, storage area network, redundant array of independent discs (RAID), cloud storage service, or any type of data storage for storing the work items and associate the work items with pre-recorded work items, the invention builds a foundation for debug sessions.

According to embodiments, the work item repository 120 stores metadata on developers' debug sessions whilst working on work items on client computing device 102. For instance, according to one implementation, this includes breakpoints set, stack traces collected, exceptions, variable reference searches, call type hierarchy inquiries as well as variables and monitors set and their values of the work items. By recording this information and associating it with the relevant work item, already stored in work item repository 120, work item server 112 creates a platform for retrieval of recorded metadata for future debug sessions to compare the recorded work items with already recorded work items, according to embodiments of the present invention. In the depicted environment, for instance, when a user is then working on a new issue, in client computing device 102, the metadata collected can be compared against other previous work items, previously stored in work item server 112, according to embodiments of the present invention. If there's a work item with sufficiently similar metadata from the developer debug sessions, the user can be prompted (or they can ask explicitly) that there is a possible matching work item. The user can then check the work item to see if it covers the same problem or if it somehow related. By determining it's not a match, work item server 112 stops suggesting it for future matches if the user wishes in client computing device 102.

Work item server 112 suggests matching work items based on a client or developer's behavior rather than just their code change. Work items that require debugging the code but not necessarily changing it can be suggested as related work item to user in client computing device 102, for comparing metadata of the work item against the work item that the user is working on, according to embodiments. As previously described, client computing device 102 monitors users or developers whilst they develop and debug their code on client computing device 102, recording relevant metadata and associating it with their current work item in work item server 112. Alternative embodiments could also extract metadata from historical work items of the work item server, such as, comments with stack traces, delivered change sets, saved breakpoint files and log files to provide a limited analysis on work items completed before debugging the new work items can be monitored and compared against previous work items. Hence, therefore, debug data can be correctly attributed to the correct work item, according to embodiments.

One implementation of this invention works on a point based system to determine similarity of work items. For each similarity 2 work items contain in their metadata, a certain number of points are attributed based on the significance of similarity. The categories may include, 1) first, breakpoints set and stack traces: Matching breakpoints on their own may cast too wide a net at times so the points awarded may be low. To narrow this, each time a breakpoint is set and hit, the stack trace can be collected instead. This distinguishes breakpoints set from common classes that are accessed from many locations. Whereas a matching breakpoint may not provide much insight, a matching breakpoint along with a matching stack would be significant. Stack traces can be split into each line within the stack trace for analysis. This can be useful for identifying code paths that are rarely used in other work items. Low point amounts could be awarded for single matching lines, but increasing exponentially if the stack matches more lines in a row. For example, each matching line gives a single point and for each additional line that is matching in the stack, the points value could double; this exponential increase can be calibrated accordingly. This means that 2 stacks that contain 5 lines that are in the same place but are called in a different order would only be awarded 5 points. But 5 matching lines in the correct sequence would provide 16 points; 2) second, monitors set or variables inspects: Monitors set would give one indication of a similarity. The contents of the variable that is monitored or inspected could also be recorded and compared. The comparisons for the contents can be abstracted too.

For example, a string's length can be compared to check if 2 strings are of similar size. By collecting multiple instances of the same variable, a standard deviation could be calculated to figure out if a string length is sufficiently similar to another instance to award points. This same technique could be used on integers, floats and other numerical values. Similarities in character sequences could be checked as well.

This could be significant where defective behavior is caused by an abnormal variable value, e.g. too short or too long, numbers too high or low, or strings with an unusual character in them. Booleans can also be compared; 3) third, searches for references to a variable and Call Type Hierarchies, for instance, if a user searches for references to a variable, the variable searched and the search results selected by the user can be collected for comparisons. Additionally, any requests to view Type Hierarchies can be logged and used for comparisons as well; 4) fourth, undelivered Code Changes, sometimes a developer will make a change that is never intended to be delivered but it is useful for debugging. A good example is inversing a boolean to test a different code path. These undelivered changes could be collected and analyzed for comparisons; 5) fifth, exceptions, unhandled exceptions can be recorded. The type of exception and its stack trace can be compared; finding a match, a search can be instigated by the user, or triggered when a certain threshold for metadata collected has been met. It can compare the metadata to each work item and allocate points accordingly.

The results can be listed in rank order. While only displaying results that are above a threshold. A standard deviation can be used to compare results to determine what is a statistically significant points value and add the result based on this value. If the user acknowledges that this is a match, the metadata from the matching work items can be linked and amalgamated so that future searches are even more effective.

Dealing with a moving source repository can be dealt with existing source code repository technology such as git or RTC. Software such as these can give a consistent idea of what constitutes a line and where its location is in each version of the codebase. This is prior art that isn't within the scope of this invention. There will be metadata that is largely common to all work items. In order to improve efficiency and reduce storage required, the engine can either refuse to collect this data altogether, or allocate an ID to a certain stack trace for example, so that all metadata can simply hold a reference to a complex datastructure rather than store it themselves. Moreover, identifying data that is common to most or all sessions is important. Points for these similarities could be rescinded depending on how the invention wishes to calibrate scores. Embodiments of the present invention can also identify missing metadata and attribute points accordingly. For example, if two work items in the code base had stack traces that were missing a class used in all other work items, points could be allocated accordingly.

Figure 2:
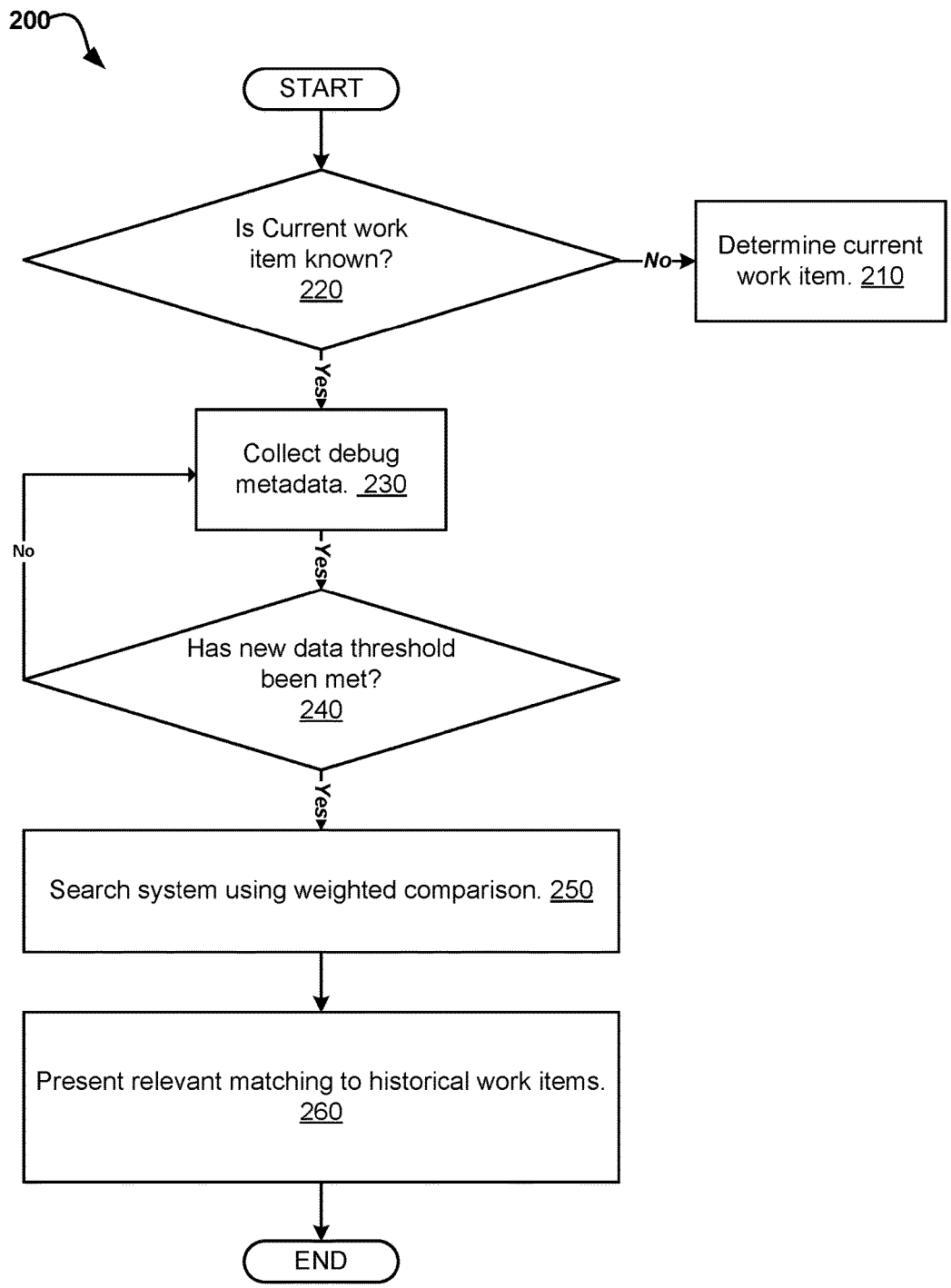
Referring now to FIG. 2, an exemplary flow diagram illustration in accordance with one embodiment is depicted.

Referring now to FIG. 2, an exemplary flow diagram illustration 200 for automatic debug of work items in accordance with one embodiment is depicted. In the depicted environment, at step 220, work item server application 114B determines whether current work item is known. If the current work item is known, then, at step 230, the work item server application 114B collects debug metadata from development team system platform interactions. However, if the current work item is not known, then, at step 210, work item server application 114B determines the current work item.

At decision 240, work item server application 114B determines whether new data threshold has been met? If a new data threshold has been met, then, at step 250, work item server application 114B searches server work item system using weighted comparison, matching the metadata for current work items to previous work item and code name histories. However, if new data threshold has not been met, then, at step 230, work item server application 114B collects debug metadata from development team system platform interactions, according to embodiments of the present invention. At step 260, work item server application 114B presents relevant matching to work items to user in client computing device 102.

Figure 3:
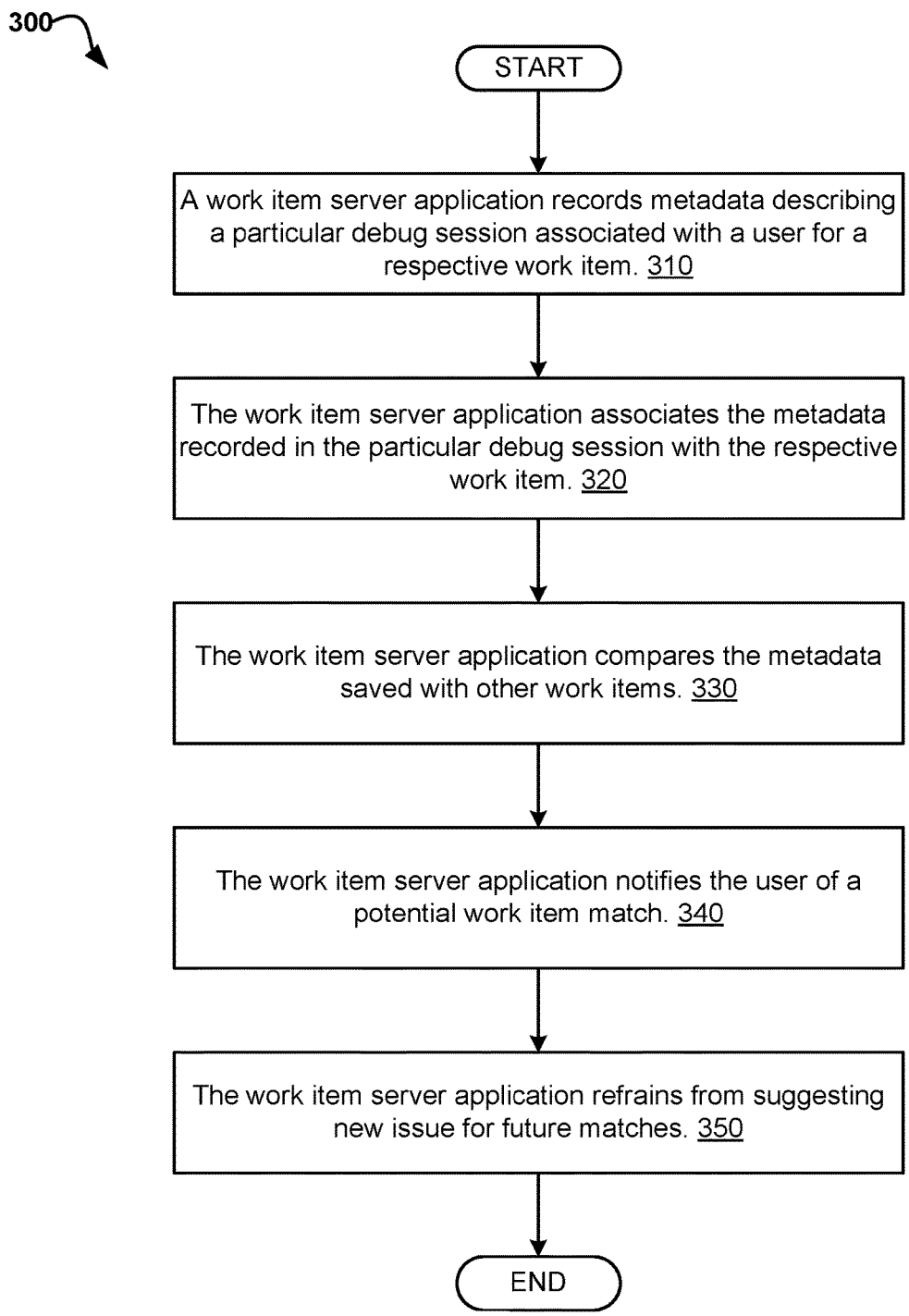
Referring now to FIG. 3, an alternative exemplary flow diagram illustration in accordance with one embodiment is depicted.

Referring now to FIG. 3, an alternative exemplary flow diagram illustration 200 for automatic debug of work items in accordance with one embodiment is depicted.

At step 310, work item server application 114B records metadata describing a particular debug session associated with a user of client computing device 102, for a respective work item of work item server 112. At step 320 the work item server application 114B associates the metadata recorded in the particular debug session with the respective work item of work item server 112, according to embodiments. At step 330, in response to the user working on a new issue, the work item server 112 compares the metadata saved with other work items. At step 340, in response to identifying a work item with a predetermined level of similar metadata from debug sessions, the work item server 112 notifies the user of a potential work item match the respective work item. At step 350, in response to the user working on a new issue, work item server application 114B refrains from suggesting the new issue for future matches.

According to embodiments of the present invention, the metadata includes breakpoints set, stack traces collected, exceptions, variable reference searches, call type hierarchy inquiries further comprising variables and monitors set and respective values. According to embodiments, the metadata recorded and an association with the respective work item are saved by work item server application 114B in work item repository 120. The potential work item match is identified according to predetermined criteria including a same problem, a particular code change, a debugging session, a work item that requires debugging code without changing the code as a related work item or a predetermined relationship including a behavioral pattern of the user. The metadata can be extracted metadata from historical work items to provide a limited analysis on the work items that are completed, according to embodiments.

Figure 4:
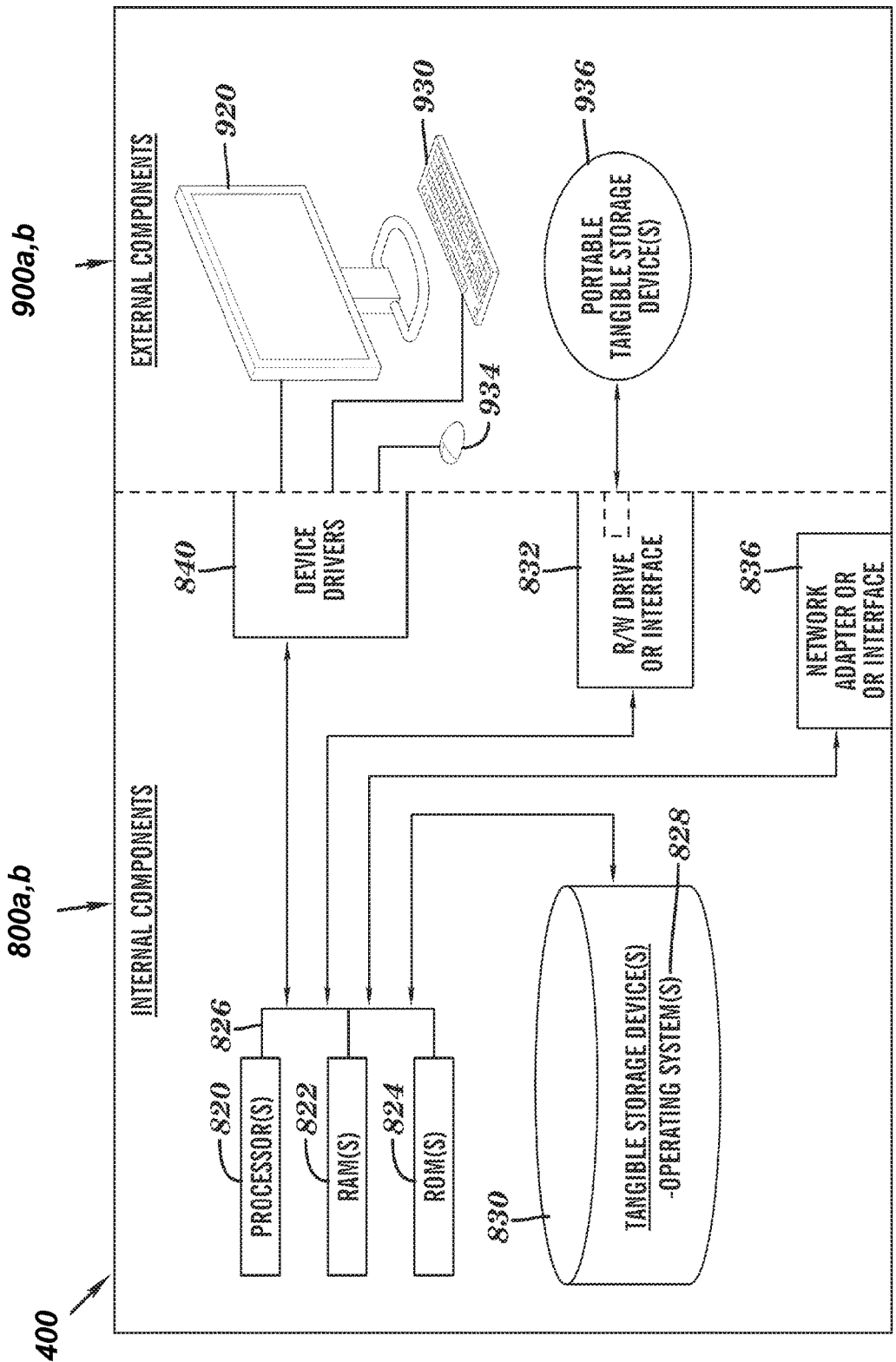
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Client computing device (FIG. 1) and work item server application 114B (FIG. 1) may include respective sets of internal components 800a,b and external components 900a,b illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and client system application 114A in client computing device 102 (FIG. 1) and work item server application 114B (FIG. 1) in work item server application 114B (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive.

Alternatively, each of the computer-readable tangible storage devices 830 is a semiconductor storage device such as ROM 824, EPROM, flash memory or any other computer-readable tangible storage device that can store a computer program and digital information. Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the client systems application 114A (FIG. 1) can be stored on one or more of the respective portable computer-readable tangible storage devices 936, read via the respective R/W drive or interface 832 and loaded into the respective hard drive 830.

Each set of internal components 800a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and client system application 114A (FIG. 1) in client computing system computer 102, and work item server application 114B (FIG. 1) in communications network 110 (FIG. 1) can be downloaded to client computing device 102 (FIG. 1) and communications network 110 (FIG. 1) from an external computer via a network (for example, the Internet, a local area network or other, wide area network) and respective network adapters or interfaces 836. From the network adapters or interfaces 836, the Software Program 108 (FIG. 1) and client system application 114A (FIG. 1) in client computing system computer 102, and work item server application 114B (FIG. 1) in communications network 110 (FIG. 1) and communications network 110 (FIG. 1) are loaded into the respective hard drive 830. The network may comprise copper wires, optical fibers, wireless transmission, routers, firewalls, switches, gateway computers and/or edge servers.

Each of the sets of external components 900a,b can include a computer display monitor 920, a keyboard 930, and a computer mouse 934. External components 900a,b can also include touch screens, virtual keyboards, touch pads, pointing devices, and other human interface devices. Each of the sets of internal components 800a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
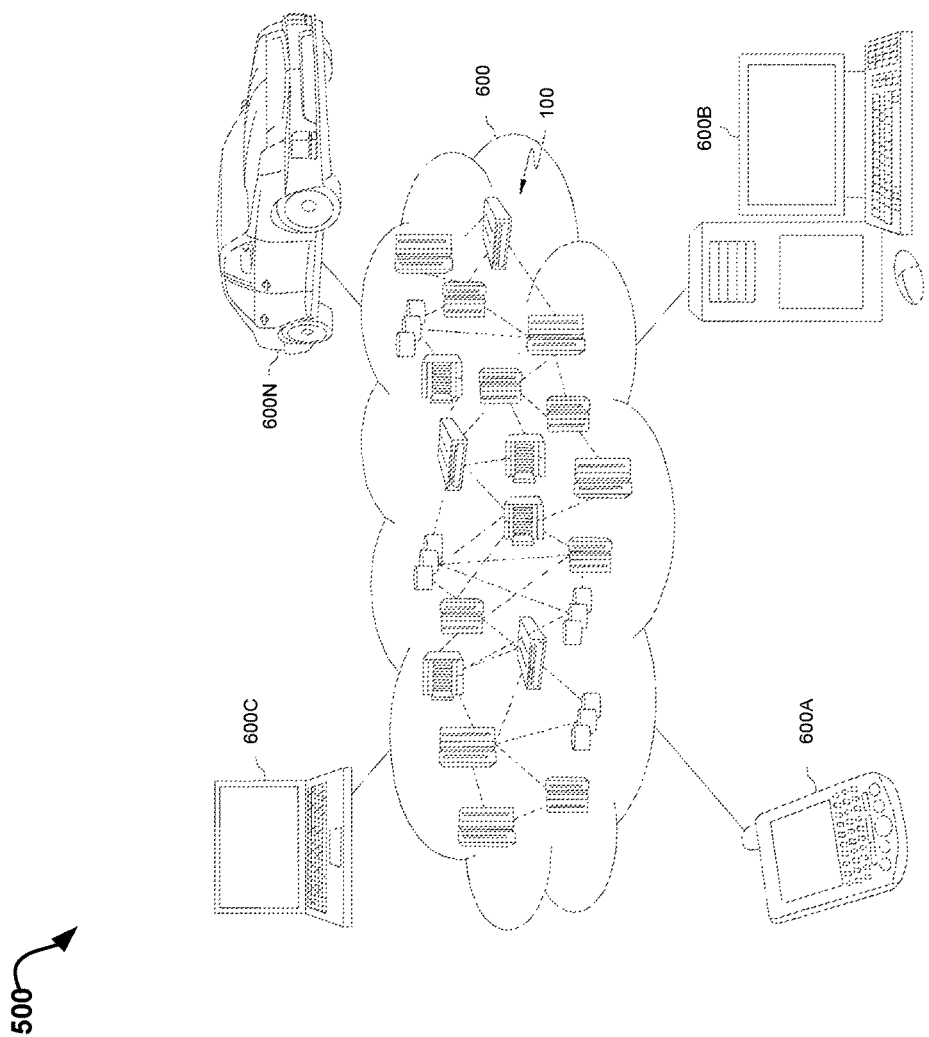
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 7 are intended to be illustrative only and that computing nodes 100 and cloud computing environment 600 can communicate with any type of computerized device over any type of network and/or network addressable connection (e.g., using a web browser).

Figure 6:
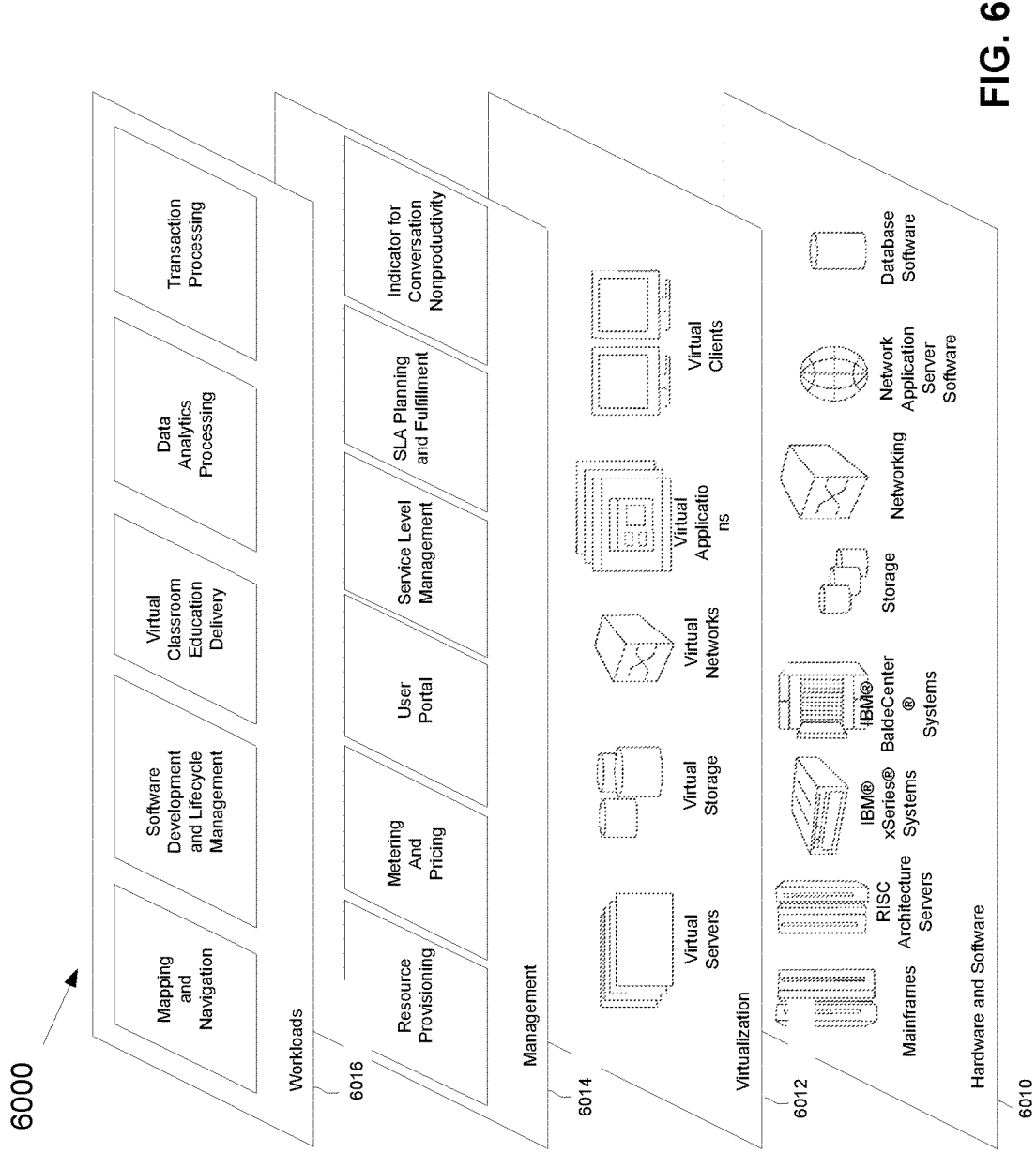
FIG. 6 is a block diagram of functional layers of the illustrative cloud computing environment of FIG. 5, in accordance with an embodiment of the present disclosure.

Referring now to FIG. 6, a set of functional abstraction layers 6000 provided by cloud computing environment 600 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Indicator for Conversation Nonproductivity may measure the productivity of a conversation between multiple users of a mobile computing device.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic debug session analysis for related work item discovery, the method comprising:
    recording first metadata describing a particular debug session associated with a user for a respective work item, wherein the recorded first metadata is based on behavioral patterns of the user while the user is developing or debugging the respective work item;
    extracting second metadata from a plurality of previously recorded work items of the user to provide a systematic analysis of behavioral patterns of the user during debug sessions, wherein the previously recorded work items are based on stack traces, delivered change sets, saved breakpoint files, and log files that were previously recorded during previous debug sessions;
    associating the first metadata recorded in the particular debug session with the extracted second metadata;
    in response to the user working on a new issue, comparing metadata for the new issue with the associated first metadata and second metadata; and
    in response to identifying, based on the compared metadata, a work item with a predetermined level of similar metadata from debug sessions, notifying the user of a potential work item match.

2. The method according to claim 1, wherein the user configures preferences for recording the first metadata during the debug session.

3. The method according to claim 1, wherein the first metadata and the association between the first metadata and the extracted second metadata are saved.

4. The method according to claim 1, wherein the potential work item match is identified according to a predetermined criterion.

5. The method according to claim 1, wherein the user specifies which work item the user is working on.

6. The method according to claim 1, wherein the work items are detected automatically.

7. A computer system for automatic debug session analysis for related work item discovery, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to record first metadata describing a particular debug session associated with a user for a respective work item, wherein the recorded first metadata is based on behavioral patterns of the user while the user is developing or debugging the respective work item;

program instructions to extract second metadata from a plurality of previously recorded work items of the user to provide a systematic analysis of behavioral patterns of the user during debug sessions, wherein the previously recorded work items are based on stack traces, delivered change sets, saved breakpoint files, and log files that were previously recorded during previous debug sessions;

program instructions to associate the first metadata recorded in the particular debug session with the extracted second metadata;

in response to the user working on a new issue, program instructions to compare metadata for the new issue with the associated first metadata and second metadata; and in response to identifying, based on the compared metadata, a work item with a predetermined level of similar metadata from debug sessions, program instructions to notify the user of a potential work item match.

8. The computer system according to claim 7, wherein the user configures preferences for recording the first metadata during the debug session.

9. The computer system according to claim 7, wherein the first metadata and the association between the first metadata and the extracted second metadata are saved.

10. The computer system according to claim 7, wherein the potential work item match is identified according to a predetermined criterion.

11. The computer system according to claim 7, wherein the user specifies which work item the user is working on.

12. The computer system according to claim 7, wherein the work items are detected automatically.

13. A computer program product for automatic debug session analysis for related work item discovery, the computer program product comprising:

one or more computer-readable tangible storage devices and program instructions stored on at least one of the one or more computer-readable tangible storage devices, the program instructions comprising:

program instructions to record first metadata describing a particular debug session associated with a user for a respective work item, wherein the recorded first metadata is based on behavioral patterns of the user while the user is developing or debugging the respective work item;

program instructions to extract second metadata from a plurality of previously recorded work items of the user to provide a systematic analysis of behavioral patterns of the user during debug sessions, wherein the previously recorded work items are based on stack traces, delivered change sets, saved breakpoint files, and log files that were previously recorded during previous debug sessions;

program instructions to associate the first metadata recorded in the particular debug session with the extracted second metadata;

in response to the user working on a new issue, program instructions to compare metadata for the new issue with the associated first metadata and second metadata; and in response to identifying, based on the compared metadata, a work item with a predetermined level of similar metadata from debug sessions, program instructions to notify the user of a potential work item match.

14. The computer program product according to claim 13, wherein the user configures preferences for recording the first the metadata during the debug session.

15. The computer program product according to claim 13, wherein the first metadata and the association between the first metadata and the extracted second metadata are saved.

16. The computer program product according to claim 13, wherein the potential work item match is identified according to a predetermined criterion.

17. The computer program product according to claim 13, wherein the user specifies which work item the user is working on.

18. The computer program product according to claim 13, wherein the work items are detected automatically.

* * * * *